(12) United States Patent
Leveille et al.

(10) Patent No.: US 12,181,453 B2
(45) Date of Patent: Dec. 31, 2024

(54) CHROMATOGRAPHY COLUMN POSITIONING ASSEMBLIES

(71) Applicant: Waters Technologies Corporation, Milford, MA (US)

(72) Inventors: Wade P. Leveille, Douglas, MA (US); Joseph D. Michienzi, Plainville, MA (US); Jeffrey Musacchio, Sharon, MA (US); Michael O. Fogwill, Uxbridge, MA (US)

(73) Assignee: Waters Technologies Corporation, Milford, MA (US)

( * ) Notice: Subject to any disclaimer, the term of this patent is extended or adjusted under 35 U.S.C. 154(b) by 165 days.

(21) Appl. No.: 17/512,864

(22) Filed: Oct. 28, 2021

(65) Prior Publication Data
US 2022/0128527 A1  Apr. 28, 2022

Related U.S. Application Data

(60) Provisional application No. 63/106,659, filed on Oct. 28, 2020.

(51) Int. Cl.
*G01N 30/60* (2006.01)
*B01D 15/22* (2006.01)
*G01N 30/46* (2006.01)

(52) U.S. Cl.
CPC ..... *G01N 30/6047* (2013.01); *G01N 30/6004* (2013.01); *G01N 30/6026* (2013.01); *G01N 30/6052* (2013.01); *B01D 15/22* (2013.01); *G01N 30/461* (2013.01)

(58) Field of Classification Search
CPC .......... G01N 30/6047; G01N 30/6052; G01N 30/6026; G01N 30/6004; G01N 30/461; B01D 15/22
See application file for complete search history.

(56) References Cited

U.S. PATENT DOCUMENTS

| | | | |
|---|---|---|---|
| 6,527,951 B1 * | 3/2003 | Tuvim | B01D 15/22 |
| | | | 210/450 |
| 2014/0166562 A1 * | 6/2014 | Michienzi | G01N 30/6026 |
| | | | 210/198.2 |

FOREIGN PATENT DOCUMENTS

| | | |
|---|---|---|
| EP | 2975398 A1 | 1/2016 |
| WO | 199815824 A1 | 4/1998 |
| WO | 2013032832 A1 | 3/2013 |

OTHER PUBLICATIONS

International Search Report and Written Opinion for International Patent Application No. PCT/US2021/056956, mailed Feb. 8, 2022.

(Continued)

*Primary Examiner* — Benjamin L Lebron
(74) *Attorney, Agent, or Firm* — Goodwin Procter LLP

(57) ABSTRACT

The exemplary embodiments provide chromatography column positioning assemblies that can ensure that the distance between face seals or other sealing surfaces/mechanisms at the respective ends of a liquid chromatography column is a desired distance (i.e., the length of the liquid chromatography column). The exemplary embodiments can adjust the separation between the face seals to accommodate different length liquid chromatography columns. For example, a chromatography column positioning assembly of an exemplary embodiment can set the distance between face seals to accommodate a 25 mm column, a 50 mm column or a 100 mm column.

9 Claims, 13 Drawing Sheets

(56) References Cited

OTHER PUBLICATIONS

International Preliminary Report on Patentability for International Patent Application No. PCT/US2021/056956, mailed May 11, 2023.

* cited by examiner

CHROMATOGRAPHY COLUMN POSITIONING ASSEMBLIES

CROSS REFERENCE TO RELATED APPLICATION

This application claims the benefit of U.S. Provisional Application No. 63/106,659, filed Oct. 28, 2020 and entitled "CHROMATOGRAPHY COLUMN POSITIONING ASSEMBLIES", the entire disclosure of which is hereby incorporated by reference.

BACKGROUND

FIG. 1 depicts a typical fluidic connection 100 for a conventional liquid chromatography column 104. The liquid chromatography column 104 includes an end fitting 102. The end fitting 102 includes a tapered ferrule seat 111 that is shaped and sized to receive a ferrule having a stem 112, a conical portion 114 and a male nut portion 116. The ferrule includes a nut 106 that may be used to drive the ferrule into the ferrule seat 111. The ferrule is connected to flexible tubing 108, such as stainless steel tubing. Such connections may be used on the inlet end and the outlet of the liquid chromatography column 104.

These type of fluidic connections to the liquid chromatography column 104 accommodate a variety of positions for the liquid chromatography column 104 in a liquid chromatography system. The use of flexible tubing 108 allows flexibility in positioning of the liquid chromatography column 104 as does the use of the nuts 106 and ferrules. When the ferrules are properly inserted into the ferrule seats 111, there is no dead volume and the stem 112 may properly interface with the liquid chromatography column 104.

SUMMARY

In accordance with a first inventive aspect, a chromatography column positioning assembly includes a chromatography column holder of a first length. The chromatography column positioning assembly also includes an extender for positioning in the chromatography column holder to occupy at least a portion of a remaining length of the chromatography column holder that is not occupied when the chromatography column holder holds a chromatography column of a second length. The second length is less than the first length.

The extender may have a length substantially equal to the first length minus the second length. The chromatography column positioning assembly may include an additional extender of a third length that differs from the second length. The chromatography column holder may include an inner lumen configured to hold the chromatography column. The extender may be configured to be positioned in the inner lumen of the chromatography column holder. The extender is integrated with the chromatography column. The extender may be configured so that the inner lumen of the extender is aligned with an inner lumen of the chromatography column when the extender is held by the chromatography column holder to create a continuous flow path through the chromatography column holder. The extender and the column may be fully enveloped by the chromatography column holder when held by the chromatography column holder. Alternatively, at least one of the extender and the column may be only partially enveloped by the chromatography column holder when held by the chromatography column holder.

In accordance with another inventive aspect, a chromatography column positioning assembly includes a first end cap and a second end cap for a chromatography column. Face seals are provided for creating seals at ends of the chromatography column. The chromatography column positioning assembly also includes a first spacer for carrying the chromatography column of a first length and for providing proper spacing between the face seals of the first end cap and the second end cap to ensure proper loading force between the ends of the chromatography column and the face seals given the first length of the column when the chromatography column is carried by the first spacer.

The first spacer may include a passage in which the chromatography column is carried. The passage may fully envelope the carried chromatography column. The passage may be an inner lumen of the first spacer. The chromatography column positioning assembly may include a second spacer for carrying the chromatography column of a second length and for providing proper spacing between the face seals of the first end cap and the second end cap to ensure proper loading force between the ends of the chromatography column and the face seals given the second length of the column when the chromatography column is carried by the second spacer. The first spacer may be configured to connect with the first end cap that connects to an outlet end of the chromatography column.

In accordance with a further additional inventive aspect, a chromatography column positioning assembly includes a first end cap for a chromatography column of a first length. The chromatography column positioning assembly also includes a second end cap for the chromatography column. The chromatography column positioning assembly additionally includes an adjustment assembly for adjusting a distance between the first end cap and the second end cap to account for a length of the chromatography column so that a force exerted by a first end of the chromatography column on the first end cap and a force exerted by a second end of the chromatography column on the second end cap are at desired levels of force.

The adjustment assembly may only adjust a position of the second end cap. The adjustment assembly may be capable of setting the second end cap in multiple different positions, each of the different positions being for a different length of the chromatography column. The adjustment assembly may include one or more rails on which the second end cap may slide. In some instances. the adjustment assembly may be capable of adjusting a position of the first end cap and a position of the second end cap.

DETAILED DESCRIPTION

Figure 1:
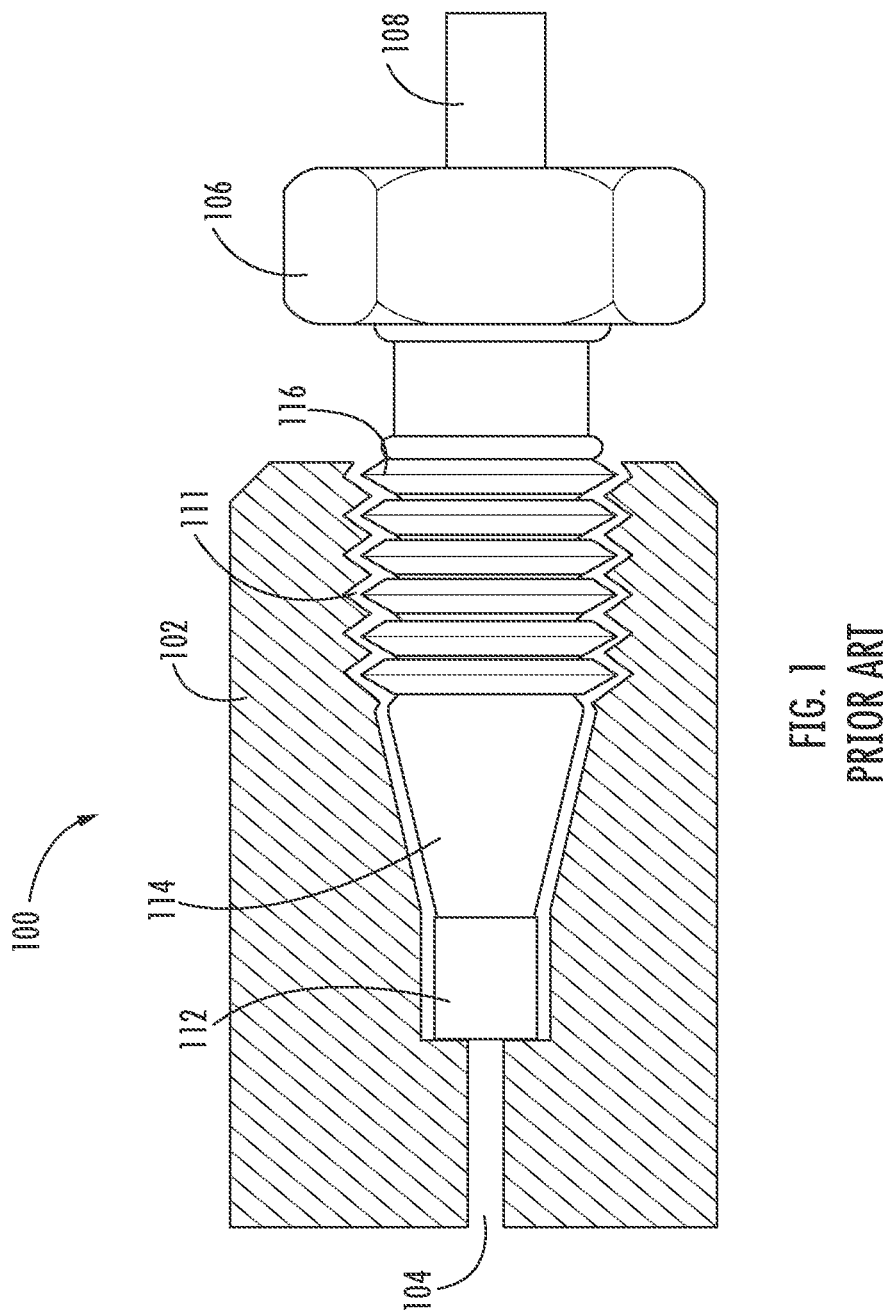
FIG. 1 depicts a conventional fluidic connection for a liquid chromatography column that uses ferrules.

There are certain disadvantages to the conventional fluidic connection with a liquid chromatography column that uses a nut and a ferrule. For example, it may be difficult to create the connection and to undo the connection. Inserting the ferrule and removing the ferrule can be challenging. For the most part, when ferrules are used, the ferrules deform around the tube making removal difficult if not impossible. The only way to renew the fluidic conduit is to replace the tube. With a face seal, one simply swaps the face seal. For applications, where the connection needs to be created and undone multiple times, this difficulty can be especially pronounced. In addition, with the nut and ferrule connection, there is the possibility of damaging the internal sealing cone surface. Such damage may render the connection faulty.

One alternative that makes it easier to create and undo fluidic connections is to use with face seals. This alternative makes the creation of a connection easier and the undoing of a connection easier because there is no ferrule to insert and remove. Furthermore, no tools are required for a face seal. The face seal may be in an end fitting or in the chromatography column.

One challenge in using end caps with face seals for fluidic connections with liquid chromatography columns is that positioning becomes more important. In order for the face seals to work properly, there must be a proper amount of loading force when the liquid chromatography column is connected to the end caps. The loading force must be sufficient so that a reliable seal is created between each face seal and a respective end of the liquid chromatography column. The loading force must not be too great so as to make it difficult to connect the liquid chromatography column and/or damage the face seals. A key determinant of whether the loading force is proper is the distance between the face seals or other sealing surface in the endcaps at the respective ends of the liquid chromatography column. Ideally, the face seals or other sealing surfaces/mechanisms of the end caps should be separated by a distance roughly equal to the length of the liquid chromatography column. Thus, for a 100 mm liquid chromatography column, the face seals should be separated by roughly 100 mm. In such a case before loading, the face seals outer faces would be separated by 100 mm plus twice the thickness of the face seals and any extra length added by the end fittings. This separation would be even slightly smaller upon loading because of the load. The degree of compression of the face seals would depend on the magnitude of the load and the compressive strength of the face seal material.

The exemplary embodiments provide chromatography column positioning assemblies that can ensure that the distance between the face seals or other sealing surfaces/mechanisms at the respective ends of a liquid chromatography column is the desired distance (i.e., the length of the liquid chromatography column). The exemplary embodiments can adjust the separation between the face seals or other sealing surfaces/mechanisms to accommodate different length liquid chromatography columns. For example, a chromatography column positioning assembly of an exemplary embodiment can set the distance between face seals to accommodate a 25 mm column, a 50 mm column or a 100 mm column.

Figure 2A:
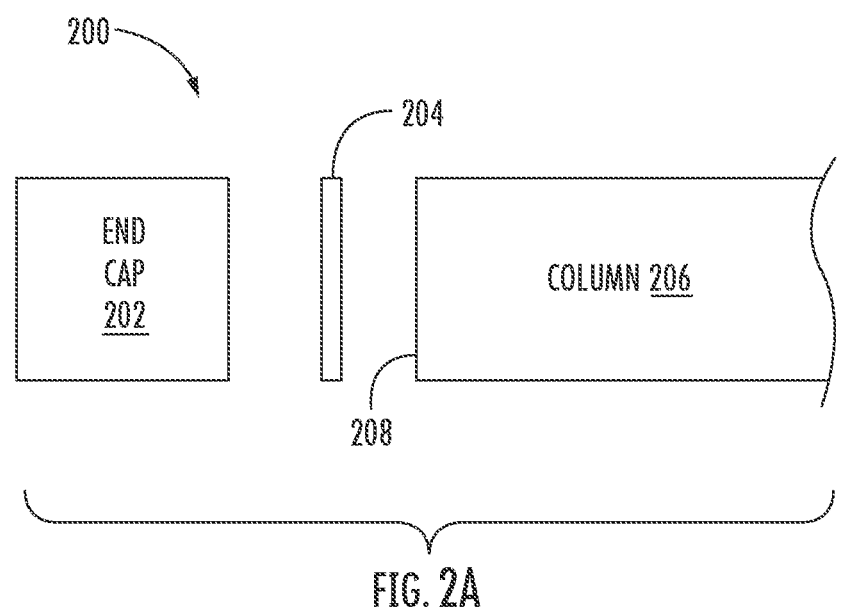
FIG. 2A depicts a partially exploded view of an end cap, face seal and chromatography column for an exemplary embodiment.
Figure 2B:
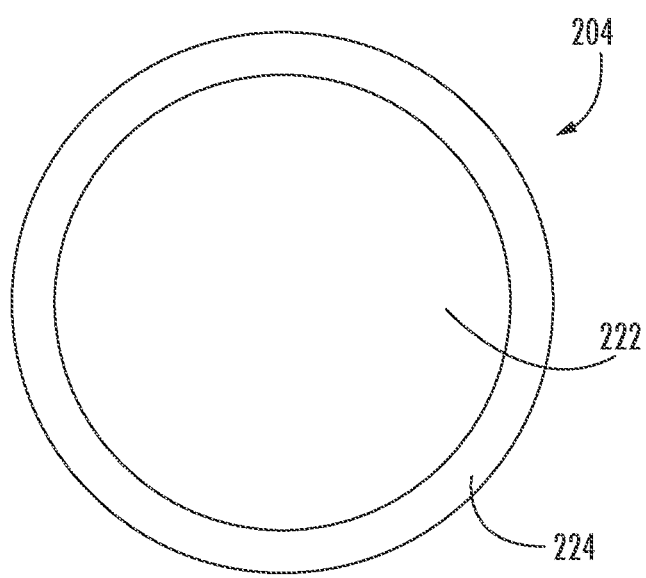
FIG. 2B depicts an illustrative face seal.
Figure 3A:
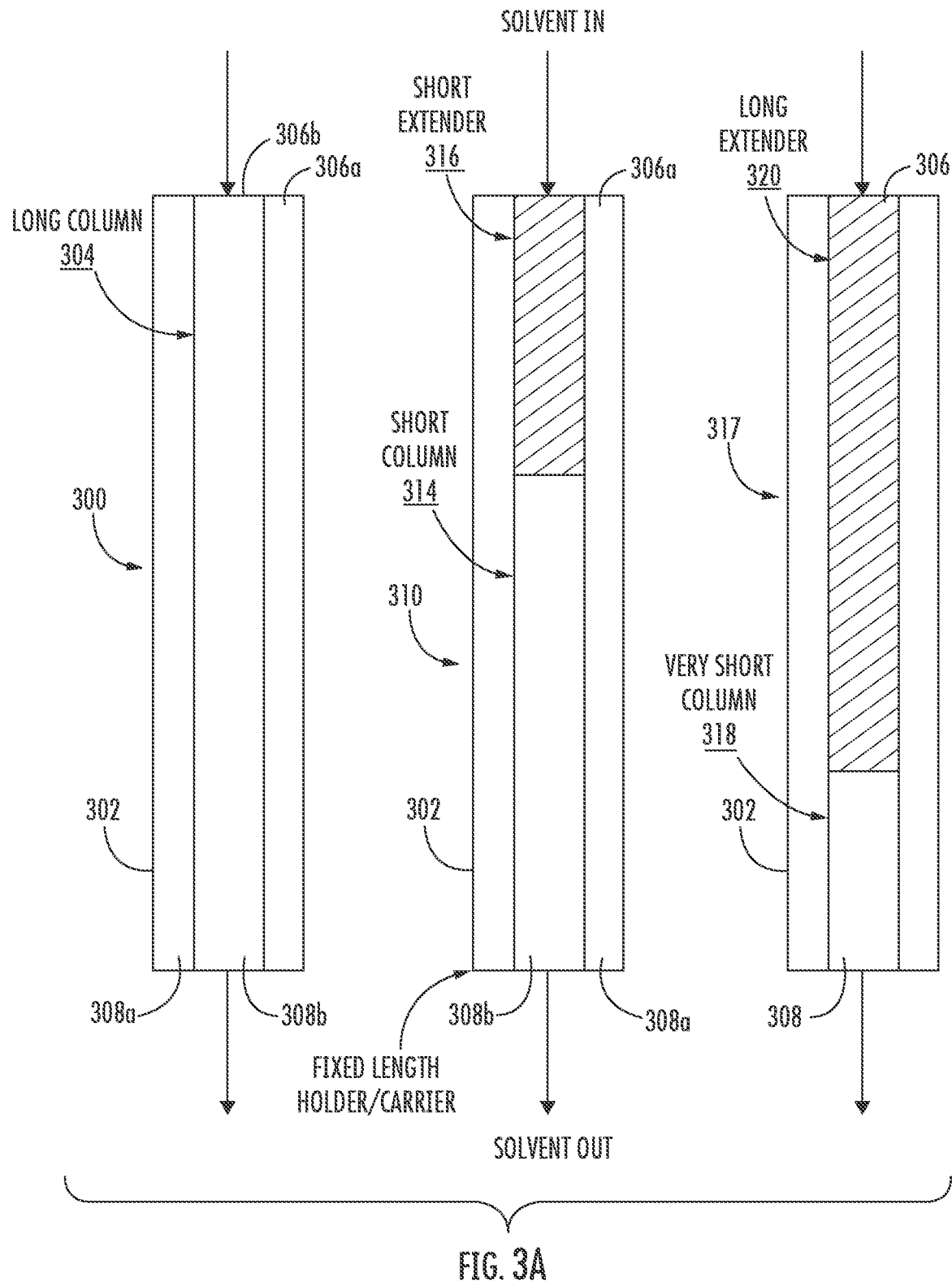
FIG. 3A depicts examples of chromatography column positioning assemblies for an exemplary embodiment.

FIG. 2A shows a diagram of a partially exploded view of an illustrative arrangement 200 where a face seal 204 is used. The arrangement 200 includes an end cap 202 and a liquid chromatography column 206. The arrangement 200 also includes a face seal 204. The face seal 204 is seated in the end cap 202 or in the column end fitting. When the end cap 202 is positioned against the liquid chromatography column 206, the face 208 of the end of the liquid chromatography column 206 abuts and presses against the face seal 204 to create the desired seal. FIG. 2B shows an example of the face seal 204. In this example, the face seal 204 is an O-ring or gasket. The face seal 204, for example, also may be a flat washer, a gasket, or a cap, like the ZenFit from Waters Corporation. The face seal 204 may take other geometric forms. The face seal 204 includes an outer ring-shaped portion 224 and a circular opening 222. The outer ring-shaped portion 224 rests against the end cap and is the portion that the circular face 208 of the liquid chromatography column abuts when connected. The circular opening 222 preferably has a diameter that matches the inner diameter of the liquid chromatography column 206. The face seal 204 may be made of a metal, an elastomer, a polymer, a plated material or the like, FIG. 3A depicts a first embodiment of a chromatography column positioning assembly 300 of an exemplary embodiment. The chromatography column positioning assembly 300 includes a chromatography column holder 302. The chromatography column holder 302 may be cylindrical with a cylindrical inner lumen. The cylindrical inner lumen is sized and shaped to receive a liquid chromatography column 304. The diameter of the inner lumen of the chromatography column holder 302 may approximate the outer diameter of the liquid chromatography column 304 to permit insertion while holding the liquid chromatography column 304 snugly. The length of the chromatography column holder 302 may be chosen to be the length of a longest liquid chromatography column that is to be used. For instance, if a 100 mm column is the longest column to be used, then the chromatography column holder 302 should also be 100 mm long. The chromatography column holder 302 may have an inlet end 306a at which fluids, such as solvent, are received and an outlet end 308a at which fluids are output. The liquid chromatography column 304 is positioned so that the inlet end 306b is positioned at the corresponding inlet end 306a of the chromatography column holder 302, and the outlet end 308b of the liquid chromatography column 304 is positioned at the outlet end 308a of the chromatography column holder 302.

The chromatography column holder 302 may be made of suitable materials, such as plastic, metal, such as surgical stainless steel, composites, polycarbonates or the like. End caps (not shown) may be secured to the ends of the chromatography column holder. The end caps may both be floating or alternatively, one end cap may be attached to the column holder. The face seals abut the ends of the liquid chromatography column 304 in such an arrangement.

When the liquid chromatography column 314 is shorter in length than the chromatography column holder 302, an extender 316 may be used as shown in chromatography column positioning assembly 310. The extender 316 occupies the inner lumen of the chromatography column holder 302 so that the total length of the liquid chromatography column 314 and the extender 316 matches the length of the chromatography column holder 302. The extender 316 is sized and shaped to be received in the inner lumen of the chromatography column holder 302. As such, the outer diameter of the extender 316 approximates the diameter of the inner lumen of the chromatography column holder 302. The extender 316 may be cylindrical in shape. The extender 316 has a fluid passage in it for receiving the fluid input into the chromatography column holder 302. The diameter of the fluid passage of the extender 316 may match the inner diameter of the liquid chromatography column 314. The extender 316 may be positioned to abut the liquid chromatography column 314 as shown. A fluid tight connection may be created. Alternatively, a sealing mechanism may be positioned at the interface where the extender 316 and the liquid chromatography column 314 abut. Thus, the solvent may flow via the inlet end 306a of the chromatography column holder 302 into the extender 316, on to the liquid chromatography column 314 and out the outlet end 308a of the chromatography column holder 302.

The chromatography column holder 302 is designed to accommodate multiple liquid chromatography column lengths. Different extenders may be used for different liquid chromatography lengths. For instance, chromatography column positioning assembly 317 shows an instance where a very short liquid chromatography column 318 is being used. The very short length of the liquid chromatography column 318 requires a long extender 320. As can be seen, the long extender 320 is quite a bit longer than the short extender 316. It will be appreciated that the length of the extenders shown is merely illustrative and that a variety of extender lengths may be used to accommodate various liquid chromatography column lengths. Moreover, a single extender need not be used at a time. In alternative embodiments, multiple extenders may be used at a time to match the length of the chromatography column holder.

Figure 3B:
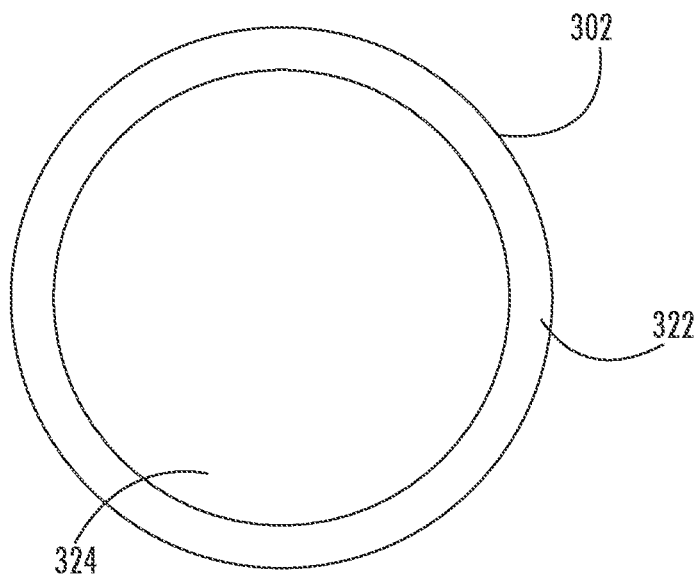
FIG. 3B depicts an illustrative inner lumen of a chromatography column holder wherein the inner lumen is completely enveloped by material of the chromatography column holder.
Figure 3C:
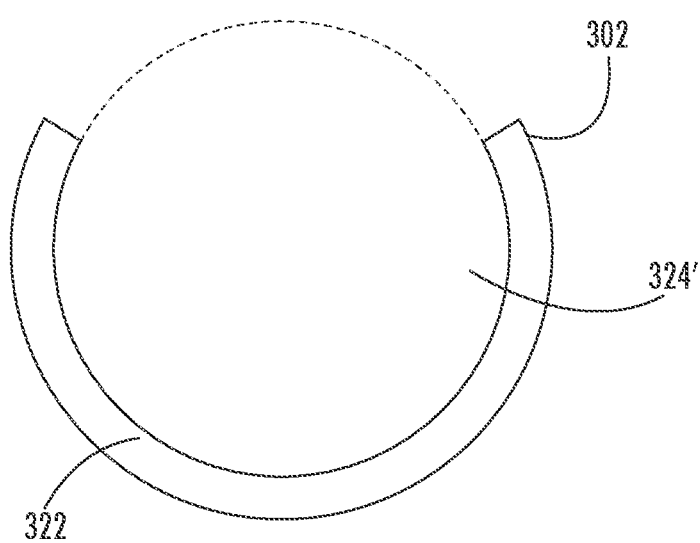
FIG. 3C depicts an illustrative inner lumen of a chromatography column holder wherein the inner lumen is partially enveloped by material of the chromatography column holder.

The chromatography column holder 302 may be constructed as shown in FIG. 3B to completely envelope and encircle the chromatography column and extenders by having an inner lumen 324 that is closed and surrounded by the material 322 of the chromatography column holder 302. In other instances, the inner lumen 324' may be opened such as shown in FIG. 3C such that the material 322 of the chromatography column holder 302 does not entirely envelope the inner lumen 324' and the chromatography column and extenders positioned therein. In other embodiments, the inner lumen may be partially enveloped and completed enveloped at various points along the longitudinal axis of the chromatography column holder 302.

The chromatography column holder 302 may be of a fixed length. This helps to ensure that the space between the face seals is fixed and as a result, ensures that the proper loading force is present when the liquid chromatography column is connected to the end caps.

Figure 4:
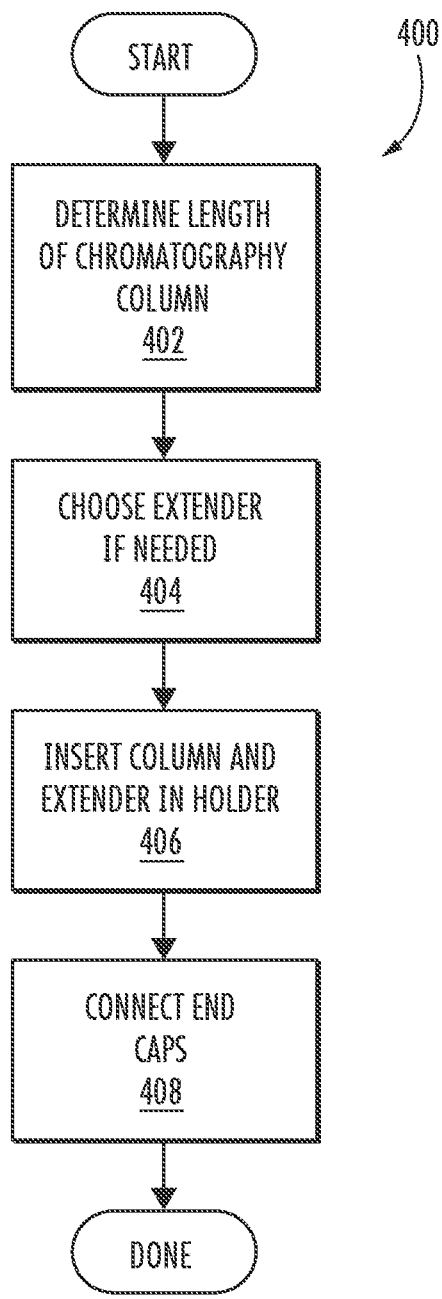
FIG. 4 depicts a flowchart of illustrative steps that may be performed relative the chromatography column positioning assemblies of FIG. 3A.

FIG. 4 shows a flowchart 400 of illustrative steps that may be performed in using a chromatography column positioning assembly like those depicted in FIG. 3A. Initially, the length of the liquid chromatography column being used is determined (402). The extender for such a length column in then chosen so that the combination of the length of the liquid chromatography column and the extender matches that of the chromatography column holder (404). If the liquid chromatography column is the maximum length liquid chromatography column for the chromatography column holder then the choice is to use no extender. The liquid chromatography column and the extender (if any) are then inserted into the chromatography column holder (406). More particularly, the chromatography column is inserted first and then the extender is inserted. The chromatography column is positioned at the outlet end to minimize post-column volumes. This may entail sliding the liquid chromatography column and the extender into the chromatography column holder so that the column and extender abut. The liquid chromatography column and the extender may be slid into an inner lumen or other construct in the chromatography column holder that secures the column and extender. The end caps are then connected (408).

Figure 5A:
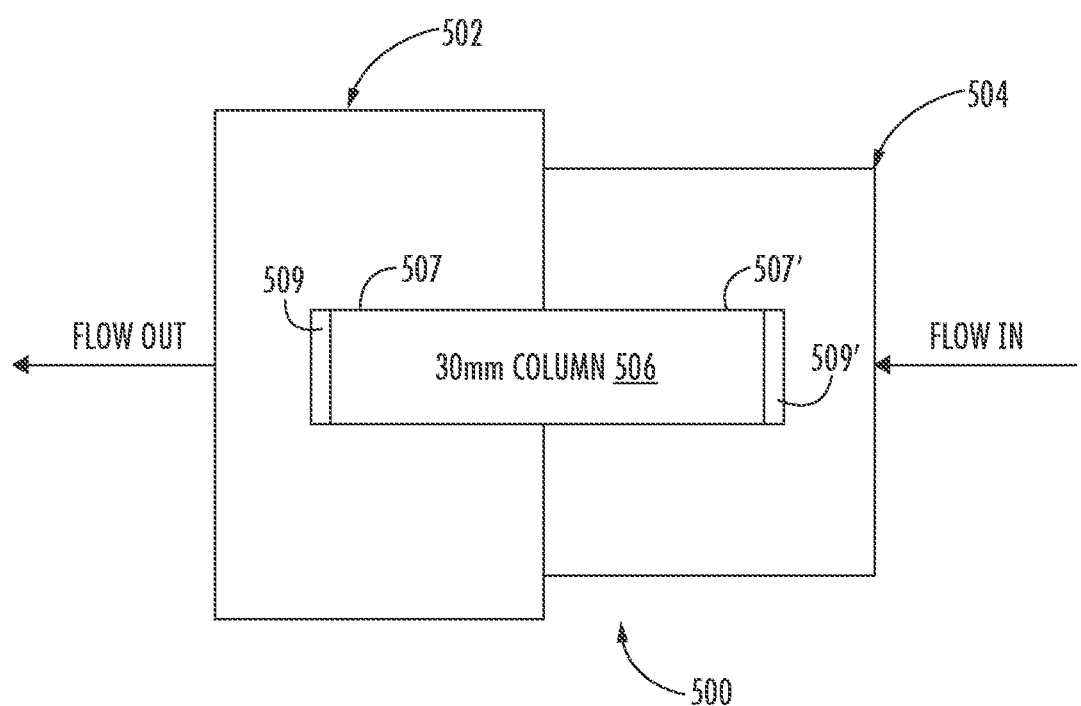
FIGS. 5A, 5B, 5C and 5D depict illustrative chromatography column positioning assemblies for an exemplary embodiment.

Another embodiment of a chromatography column positioning assembly 500 of an exemplary embodiment is depicted in FIG. 5A. The chromatography column positioning assembly 500 includes two end caps 502 and 504. End cap 502 is for the outlet end of a liquid chromatography column 506, and end cap 504 is for the inlet end of the liquid chromatography column 506. Matching seats 507 and 507' are provided in the respective end caps 502 and 504 for seating the liquid chromatography column 506. Face seals 509 and 509' are provided to create seals with the ends of the liquid chromatography column 506. As mentioned above, the face seals may be in the end caps or the chromatography column. The end caps 502 and 504 have seats 507 and 507' that are sized for the smallest length liquid chromatography column that will be used. In this case, the smallest length liquid chromatography column is 30 mm in length. The seats 507 and 507' are sized to match the outer diameter of the liquid chromatography column 506.

Figure 5B:
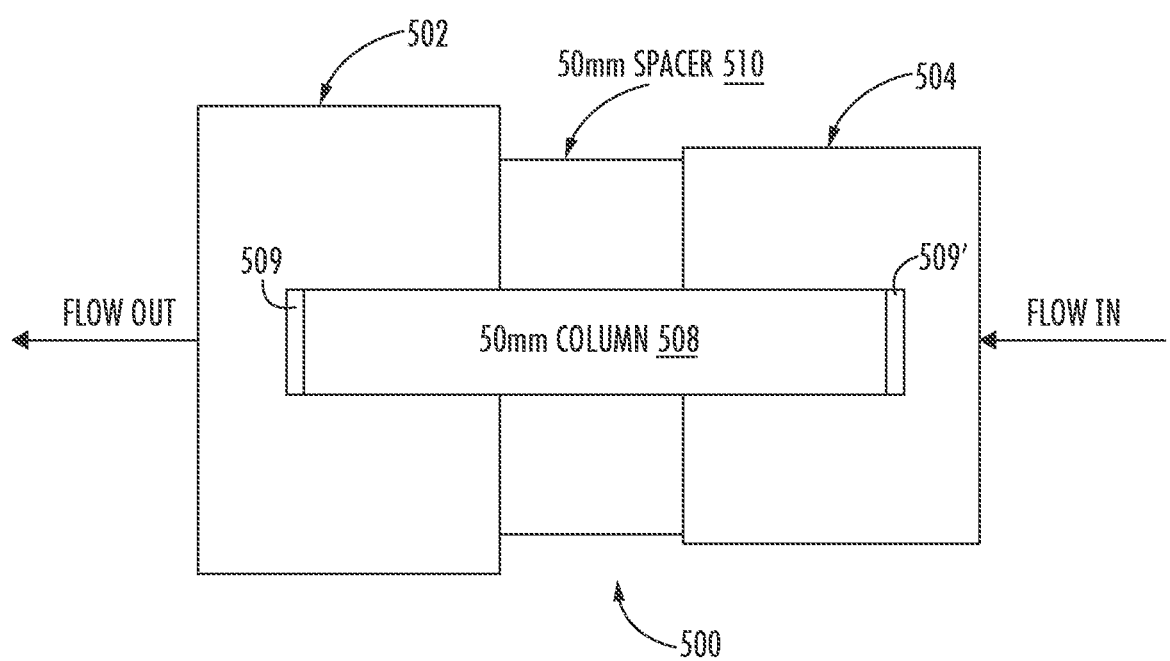

In some instances, the chromatography column positioning assembly 500 may be used with a liquid chromatography column that has a length greater than the minimum length. In that case a spacer may be used. FIG. 5B shows an example of such a spacer 510. The spacer 510 extends the length of the chromatography column positioning assembly 500 to accommodate the longer liquid chromatography column 508. The spacer 510 is situated between the end caps 502 and 504. The spacer 510 may be secured to one or more of the end caps via a friction fit, snap fit, ¼ turn, ball-detent, a spring-loaded approach or other securing mechanism. Structures may be provided in the ends of the spacer 510 and/or in the end caps 502 and 504 to secure the spacer 510 to the end caps 502 and 504. The spacer 510 includes a passage, such as an inner lumen, through the liquid chromatography column may pass. The passage is sized and shaped to accommodate the liquid chromatography column 508. The passage may be partially open or fully closed to partially or fully envelope the liquid chromatography column 508.

The length of the spacer is determined by the difference in length between the liquid chromatography column 508 being used and the minimum length liquid chromatography column 506. In the example of FIG. 5B, the length of the liquid chromatography column 508 being used is 50 mm and the length of the minimum length liquid chromatography column 506 is 30 mm. Hence, the spacer 510 is 20 mm in length.

The spacer 510 may be made of plastic, metal, like surgical stainless steel, polycarbonate or other suitable materials. The spacer 510 should be sufficiently rugged to be used multiple times and should have a low enough frictional coefficient to enable the liquid chromatography column 508 to slide though the passage provided in the spacer 510.

Figure 5C:
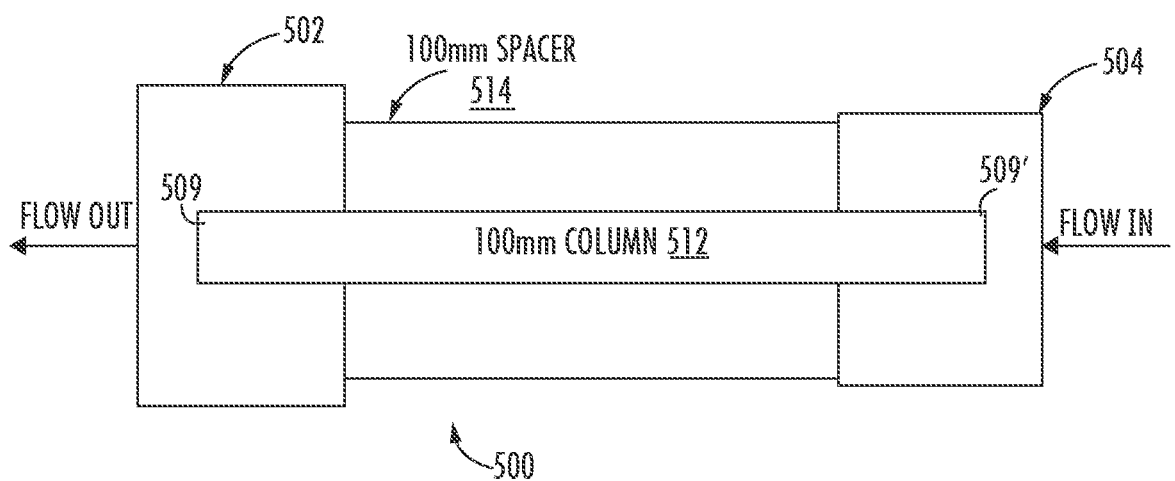

The chromatography column positioning assembly 500 may accommodate different length liquid chromatography columns by providing different length spacers. FIG. 5C shows a longer spacer 514 for a 100 mm liquid chromatography column 512. A variety of different spacer lengths may be provided and used to accommodate additional liquid chromatography column lengths.

Figure 5D:
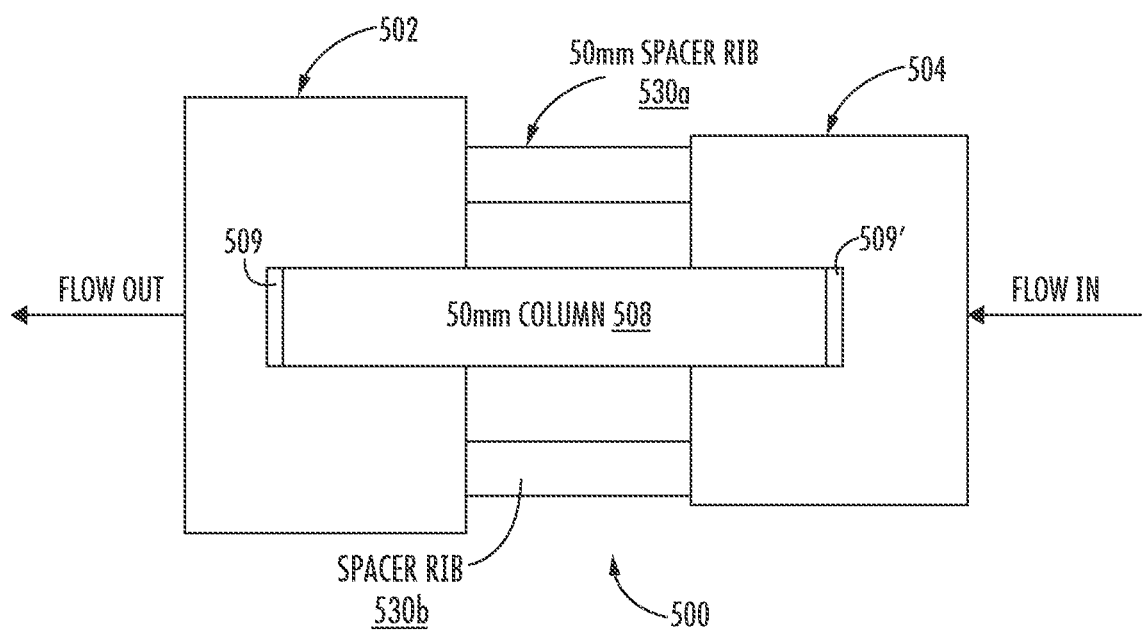

FIG. 5D depicts an alternative spacer arrangement for the chromatography column positioning assembly 500. In this spacer arrangement, the spacer is formed of stand offs 530a and 530b that extend between the end caps 502 and 504. The liquid chromatography column 508 passes through free space situated between the stand offs 530a and 530b. The stand offs 530a and 530b provide the needed length to accommodate the liquid chromatography column 508.

The embodiments of FIG. 5A-5D ensure that the distance between the face seals matches the column length. Therefore, there is the proper loading force between the ends of the liquid chromatography column and the face seals.

Figure 6:
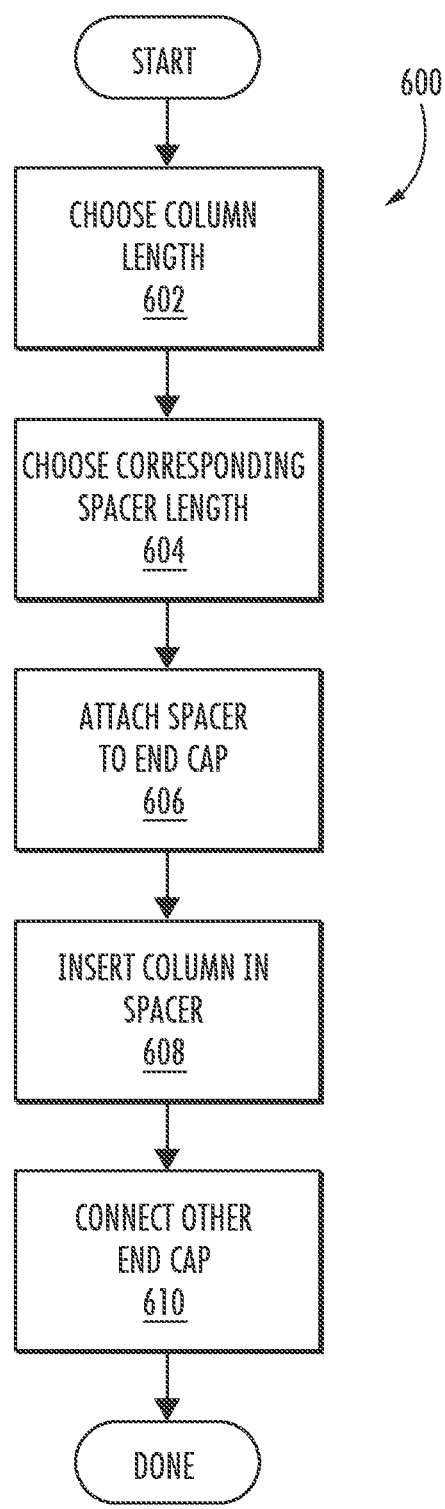
FIG. 6 depicts a flowchart of illustrative steps that may be performed relative the chromatography column positioning assemblies of FIGS. 5A-5D.

FIG. 6 provides a flowchart 600 of illustrative steps that may performed to use the chromatography column positioning assembly 500 of FIGS. 5A-5D when a spacer is required. First, a length for the liquid chromatography column is selected (602). A corresponding length spacer is then selected (604). The spacer is attached to an end cap (606). The liquid chromatography column is inserted into the spacer (608). In some cases, this may entail sliding the liquid chromatography column into the passage in the spacer and in other cases this may entail positioning the liquid chromatography column between the spacer ribs. The other end cap is then secured to the other end cap (610).

Figure 7:
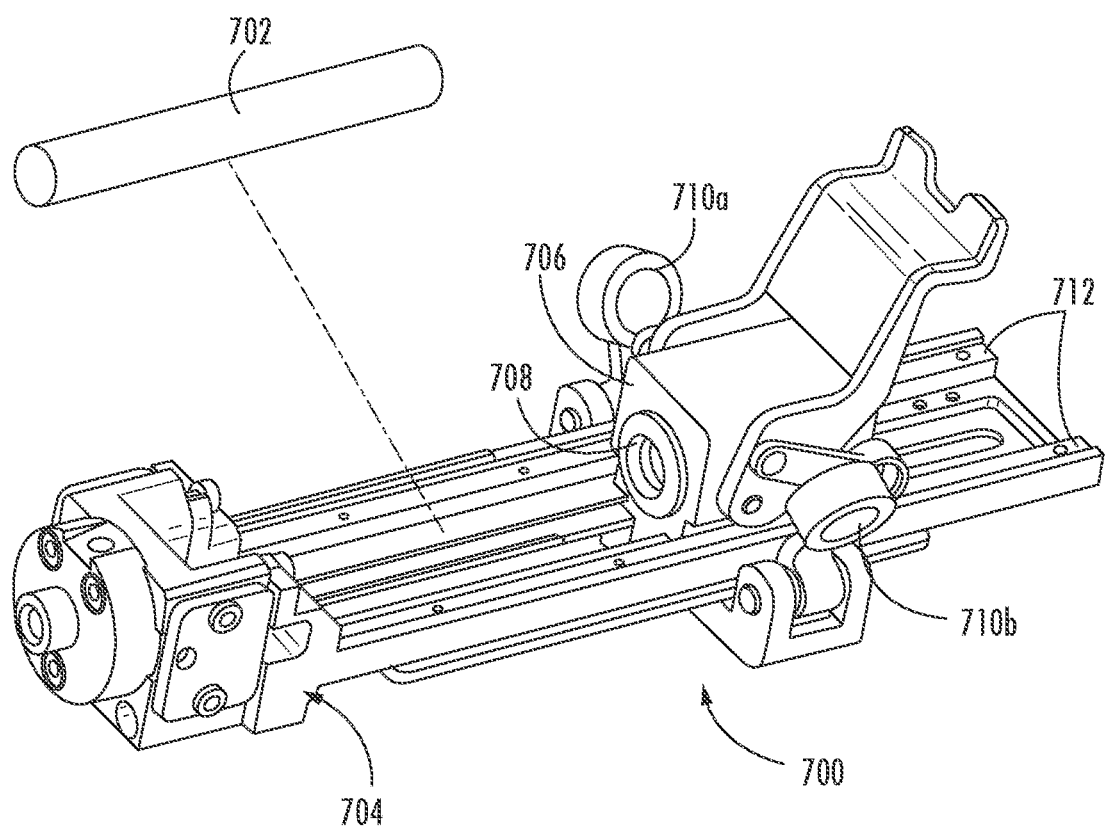
FIG. 7 depicts illustrative chromatography column positioning assemblies for an exemplary embodiment.

FIG. 7 depicts another exemplary embodiment of a chromatography column positioning assembly 700. In this embodiment there is a stationary base 704 which incorporates an end cap and a sliding end cap 708 in a sliding cap adjustment assembly. A liquid chromatography column 702 may be positioned between the end caps. The sliding end cap 708 may slide to different longitudinal positions on rails 712 to accommodate different liquid chromatography column lengths. Locks 710a and 710b may lock the position of the sliding cap 708. Face seals like face seal 204 may be positioned within the respective end caps or in the chromatography column. The position of the sliding cap 708 may be set manually or via a motor or other automated mechanism. In some embodiments, both end caps slide or are otherwise moveable along a longitudinal axis.

Figure 8:
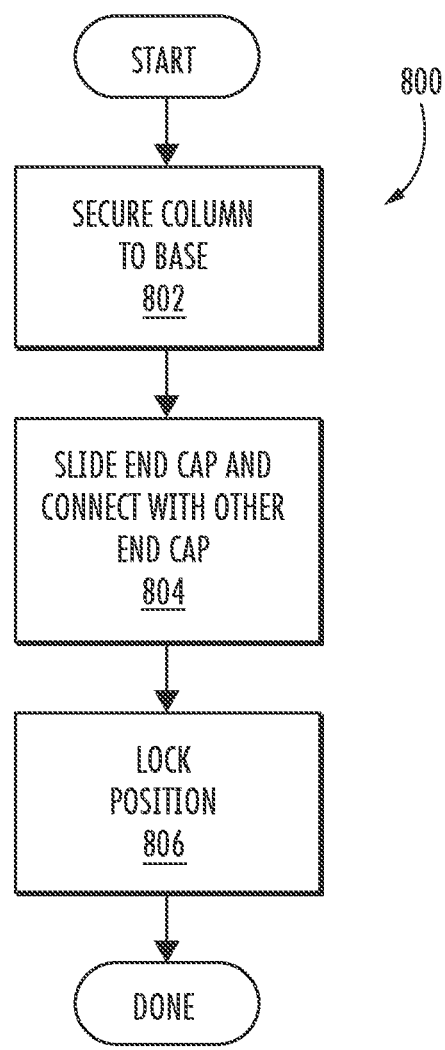
FIG. 8 depicts a flowchart of illustrative steps that may be performed relative the chromatography column positioning assembly of FIG. 7.

FIG. 8 depicts a flowchart 800 of illustrative steps for using the chromatography column positioning assembly 700. The liquid chromatography column is secured to the base (802). The end cap in the base is connected to an end of the liquid chromatography column. The sliding end cap is then slid into a desired position and connected with the end of the liquid chromatography column (804). The position of the sliding end cap is locked using the locks (806).

While exemplary embodiments have been described herein, various changes in form and detail may be made without departing from the intended scope as defined in the appended claims.

The invention claimed is:

1. A chromatography column positioning assembly for accommodating different chromatography column lengths, comprising:
    an inlet face seal;
    an outlet face seal;
    a chromatography column holder of a first length for holding a chromatography column in a position for creating a fluidic connection, the chromatography column holder:
        being configured for multiple uses with chromatography columns of different lengths,
        having a length to engage with the inlet face seal and the outlet face seal and which is a length of a longest chromatography column for which the chromatography column holder is configured for use with; and
    an extender for positioning in the chromatography column holder to occupy at least a portion of the first length of the chromatography column holder that is not occupied when the chromatography column holder holds a chromatography column of a second length, where the second length is less than the first length.

2. The chromatography column positioning assembly of claim 1, wherein the extender has a length substantially equal to the first length minus the second length.

3. The chromatography column positioning assembly of claim 1, further comprising an additional extender of a third length that differs from the second length.

4. The chromatography column positioning assembly of claim 1, wherein the chromatography column holder includes an inner lumen configured to hold the chromatography column.

5. The chromatography column positioning assembly of claim 4, wherein the extender is configured to be positioned in the inner lumen of the chromatography column holder.

6. The chromatography column positioning assembly of claim 1, wherein the extender is integrated with the column.

7. The chromatography column positioning assembly of claim 6, wherein the extender is configured so that the inner lumen of the extender is aligned with an inner lumen of the chromatography column when the extender is held by the chromatography column holder to create a continuous flow path through the chromatography column holder.

8. The chromatography column positioning assembly of claim 1, wherein the extender and the column are fully enveloped by the chromatography column holder when held by the chromatography column holder.

9. The chromatography column positioning assembly of claim 1, wherein at least one of the extender and the column is only partially enveloped by the chromatography column holder when held by the chromatography column holder.

* * * * *